US008634534B1

(12) United States Patent
Brandt et al.

(10) Patent No.: US 8,634,534 B1
(45) Date of Patent: Jan. 21, 2014

(54) CALL RECOVERY

(75) Inventors: Olaf Brandt, Sunnyvale, CA (US); Gang Wang, Sunnyvale, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 660 days.

(21) Appl. No.: 12/895,729

(22) Filed: Sep. 30, 2010

(51) Int. Cl.
*H04M 7/00* (2006.01)

(52) U.S. Cl.
USPC ............ 379/221.01; 379/221.03; 379/221.04; 370/217; 370/220

(58) Field of Classification Search
USPC ........... 379/221.01, 221.03, 221.04; 370/217, 370/220
See application file for complete search history.

(56) References Cited

U.S. PATENT DOCUMENTS

| | | | |
|---|---|---|---|
| 7,804,953 B1* | 9/2010 | Antonios et al. | 379/266.08 |
| 2005/0091392 A1 | 4/2005 | Gesswein et al. | |
| 2007/0118881 A1 | 5/2007 | Mitchell et al. | |
| 2007/0206505 A1 | 9/2007 | Forbes | |
| 2009/0028161 A1 | 1/2009 | Fullarton et al. | |
| 2009/0327499 A1 | 12/2009 | Strickland et al. | |
| 2011/0310773 A1* | 12/2011 | Iyengar et al. | 370/259 |

OTHER PUBLICATIONS

Avaya Communication Manager Network Region Configuration Guide, Jul. 2004, 24 pages.
Mitel 3300 IP Communications Platform, Engineering Guidelines Release 8.0, Jul. 2007, 310 pages.
Mitel 3300 IP Communications Platform, Engineering Guidelines Release 9.0, Sep. 2008, 340 pages.
PCT International Search Report and Written Opinion, PCT Application No. PCT/US09/31702, Mar. 3, 2009, 8 pages.

* cited by examiner

*Primary Examiner* — Gerald Gauthier
*Assistant Examiner* — Simon King
(74) *Attorney, Agent, or Firm* — Patent Law Works LLP

(57) ABSTRACT

A system for call recovery, according to one embodiment of the present invention comprises a first device, a second device, a switch and a failover device. The first device, second device and failover device are communicatively coupled to the switch. The switch has a first communicative connection with a first device and a second communicative connection with a second device. The first and second communicative connections form a call between the first and second devices. The switch determines a recovery rule for the call and identifies the failover device based on the recover rule. The switch determines a call failure event during the call between the second device and the first device. The failover device builds a new communicative connection to the switch so that the failover device is communicatively coupled to the switch responsive to the call failure event, and connected on a call with the second device.

30 Claims, 13 Drawing Sheets

595A

| CALL DESCRIPTION 510 | CALL FAILURE DESCRIPTION 512 | FAILOVER DEVICE 514 | SHORT DESCRIPTION OF RECOVERY RULE 516 |
|---|---|---|---|
| 520: SECOND DEVICE CONNECTED TO FIRST DEVICE (E.G., PHONE 108 CONNECTED ON A CALL WITH PHONE 122B) | 522: FIRST DEVICE HANG-UP (E.G., IP PHONE 122B HANG-UP) | 524: SPECIFIED IVR (E.G., IVR 111C) | 526: TRANSFER CALL TO POST-CALL SURVEY |

| CALL DESCRIPTION 510 | CALL FAILURE DESCRIPTION 512 | FAILOVER DEVICE 514 | SHORT DESCRIPTION OF RECOVERY RULE 516 |
|---|---|---|---|
| 530: SECOND DEVICE CONNECTED TO FIRST DEVICE (E.G., PHONE 107 CONNECTED ON A CALL WITH PHONE 122C) | 532: NETWORK CONNECTION ERROR TO FIRST DEVICE (E.G., NETWORK 190 FAILURE) | 534: SPECIFIED IVR (E.G., IVR 111C) | 536: IVR PLAYS BACKUP AUTO-ATTENDANT |

| CALL DESCRIPTION 510 | CALL FAILURE DESCRIPTION 512 | FAILOVER DEVICE 514 | SHORT DESCRIPTION OF RECOVERY RULE 516 |
|---|---|---|---|
| 540: SECOND DEVICE CONNECTED TO FIRST DEVICE (E.G., PHONE 107 CONNECTED ON A CALL WITH PHONE 122C) | 542: FIRST DEVICE HANG-UP (E.G., IP PHONE 122C HANG-UP) | 544: SPECIFIED PHONE (E.G., IP PHONE 122B) | 546: MOVE CALL TO ALTERNATIVE IP PHONE FOR CALL RECOVERY |

CALL RECOVERY

BACKGROUND OF THE INVENTION

1. Field of the Invention

The present invention relates to telephony systems such as those using Voice over Internet Protocol (VoIP). In particular, the present invention relates to recovering calls to a failover device after a call failure event.

2. Description of the Background Art

An Internet Protocol ("IP") based private branch exchange involves numerous telephony endpoints connected across a network. A typical telephone call will establish a connection between two different IP devices with voice traffic flowing between those two endpoints. If network interruption occurs between those endpoints, the call is typically disconnected at each of the isolated endpoints. Similarly if one endpoint in a two party call were to fail, the other endpoint will typically disconnect the call. This is particularly troublesome if one of the endpoints is not a live person. For example, if one of the endpoints is an Interactive Voice Response module ("IVR") or automated attendant, then the call will be lost forever.

SUMMARY OF THE INVENTION

The present invention overcomes the deficiencies and shortcomings of the prior art by providing system and method for call recovery. The system of the present invention is particularly advantageous because it allows telephony call to be recovered if a call failure event occurs. In one embodiment, the system of the present invention comprises a first device, a second device, a switch and a failover device. The first device, second device and failover device are communicatively coupled to the switch. The first device has a first communicative connection with the switch and the second device has a second communicative connection with the switch. The first and second communicative connections form a call between the first and second devices. The switch determines a recovery rule for the call between the first device and the second device and identifies the failover device based on the recover rule. The switch sends the recovery rule to the failover device and determines a call failure event during the call between the second device and the first device. In one embodiment, the switch comprises various modules that provide the functionality of the switch. The failover device builds a new communicative connection to the switch so that the failover device is communicatively coupled to the second device responsive to the call failure event.

BRIEF DESCRIPTION OF THE DRAWINGS

The accompanying drawings illustrate several embodiments of the invention and, together with the description, serve to explain the principles of the invention. The invention is illustrated by way of example, and not by way of limitation in the figures of the accompanying drawings in which like reference numerals are used to refer to similar elements.

FIGS. 5A, 5C and 5E are tables illustrating fallback rules according to one embodiment of the present invention.

DETAILED DESCRIPTION OF THE PREFERRED EMBODIMENTS

Figure 1:
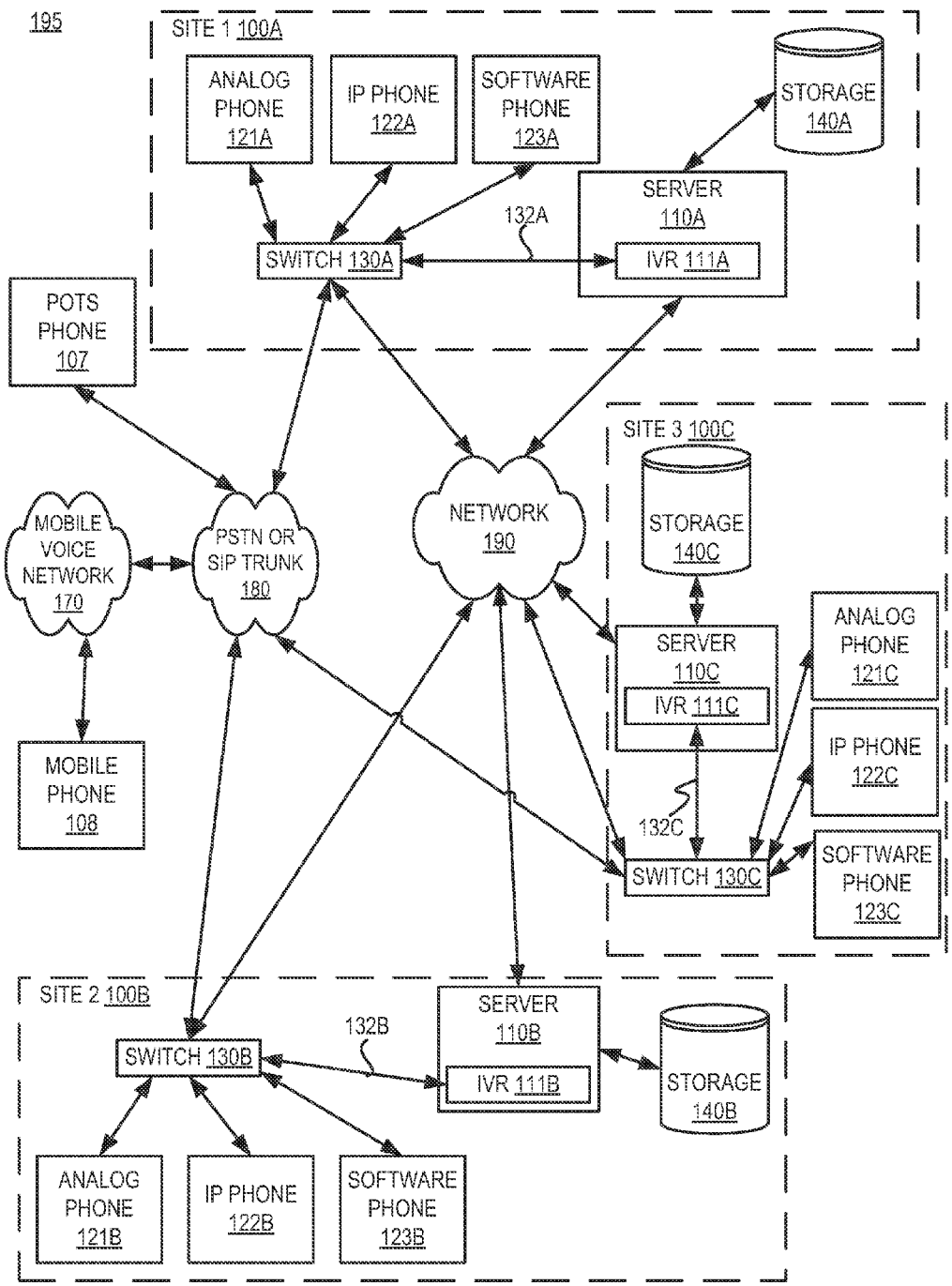
FIG. 1 is a high-level block diagram illustrating a functional view of a distributed telephony system according to one embodiment of the present invention.

A system and method for call recovery in telephony is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to system operation and particular hardware. However, the present invention applies to any type of computing device that can receive a data and commands, and any peripheral devices providing services.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a non-transitory computer-readable memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Enterprises often have several offices or call centers that are located in a plurality of disparate locations. These sites include a number of first devices (e.g., IP phone, softphone, etc.) that are configured for communications with first and second telephony devices (e.g., mobile phone devices, plain old telephone devices, voicemail etc.). From time to time there is a failure of the first device or the network that is being used to connect the call. This is referred to herein as a "call failure event." This is particularly important when the first device is operating an Interactive Voice Response ("IVR") or auto-attendant application to provide an automated call experience to the user of a second device. Here, since a live person is not connected on the first device side of the call, the call will likely be lost forever due to the call failure event. The embodiments described herein provide a system and method for recovering calls in response to call failure events.

FIG. 1 illustrates a block diagram of a distributed telephony system 195, according to one embodiment of the present invention. The illustrated embodiment of telephony system 195 includes a first site 100A, a second site 100B and a third site 100C. As used herein, a site represents a grouping of resources. In the illustrated embodiment, the three sites 100A, 100B, 100C are communicatively coupled via a network 190. One skilled in the art will note that sites 100A, 100B, 100C can be physically distinct from each other or merely topology-related groupings that are not in physically distinct locations. The telephony system 195 architecture in FIG. 1 is used only by way of example. While FIG. 1 illustrates three sites, the present invention applies to any system architecture containing one or more sites. Furthermore, while only one network 190 is coupled to the sites 100A, 100B, 100C, in practice any number of networks 190 can be connected to the sites 100A, 100B, 100C In one embodiment of the present invention, the network 190 is a partially public or a wholly public network such as the Internet. The network 190 can also be a private network or include one or more distinct or logical private networks (e.g., virtual private networks, Wide Area Networks ("WAN") and/ or Local Area Networks ("LAN")). Additionally, the communication links to and from the network 190 can be wireline or wireless (i.e., terrestrial- or satellite-based transceivers). In one embodiment of the present invention, the network 190 is an IP-based wide or metropolitan area network.

The software that supports the computer-integrated functionality of providing the above-described telephony services is generally implemented as a client-server environment in which the participants or clients (distributed telephony users) communicate with a server 110A, 110B, 110C. Computer-integrated features rely not only on a server's application platform but also on the availability of the network 190 bandwidth that connects the switches (130A, 130B, 130C), servers (110A, 110B, 110C) and application services.

The first site 100A includes a server 110A, a switch 130A, three endpoints (analog phone 121A, IP phone 122A and software phone 123A) and a storage device 140A. The switch 130A represents a Voice over Internet Protocol (VoIP) device to which a number of endpoints can be coupled, such as analog phones 121A, 1P phones 122A, software phones (softphones) 123A, and the Interactive Voice Response module 111A ("IVR 111A") comprised within the server 110A. The IVR 111A is described in further detail below.

In the illustrated embodiment, the switch 130A is coupled to the network 190. The switch 130A is also coupled to the server 110A via signal line 132A and to the Public Switched Telephone Network (PSTN) trunk 180 via an analog or digital trunk line (e.g., a T1 or E1 interface) or a Session Initiation Protocol ("SIP") trunk service provider. In the illustrated configuration, the switch 130A provides an interface for calls originating from or terminating on the PSTN or SIP trunk 180. The PSTN 180 is coupled to any number of Plain Old Telephone phone Service phone (POTS phone) 107, and a mobile voice network 170 coupled to any number of mobile phones represented by mobile phone 108. Thus, POTS phone 107 calls and mobile phone 108 calls can originate on the switch 130A via the PSTN 180.

A first device is any telephony device. For example, a first device is one of: the analog phone 121; the IP phone 122; the software phone 123; the switch 130; the IVR 111; the mobile phone 108; the POTS phone 107.

A second device is any telephony device that is initially connected on a call with the first device. For example, the second device is one of: the analog phone 121; the IP phone 122; the software phone 123; the switch 130; the IVR 111; the mobile phone 108; the POTS phone 107.

In some portions of this description the POTS phone 107 and mobile phone 108 are referred to herein individually as "an/the second device" or collectively as "the second devices." Similarly, the analog phones 121, IP phones 122, software phones 123, switches 130 and IVRs 111) are referred to herein as individually as "an/the first device" or collectively as "the first devices." Such descriptions are examples of embodiments of the present invention, and not intended to be limiting since the second device is not required to be external to a site 100 (e.g., POTS phone 107, mobile phone 108) and the first device is not required to be internal to a site 100 (e.g., analog phones 121, IP phones 122, etc.).

In one embodiment, the first device is a mobile phone 108 connected to a switch 130 that acts as a gateway that enables the mobile phone 108 to act as an enterprise telephony device.

Although only a single switch 130A, 130B, 130C per site 100A, 100B, 100C is shown in FIG. 1, those skilled in the art will recognize that a particular site such as the first site 100A may include a plurality of switches 130. The switches 130A, 130B, 130C will be described in more detail below with reference to FIG. 2.

In one embodiment, the switch 130A is comprised within the server 110A so that the server 110A can provide the functionality of the switch 130A. For example, in one embodiment the sever 110A stores computer code and routines on a memory (not pictured) that is executable by a processor (not pictured) to provide the functionality of the switch 130A (i.e., the sever 110A stores and is configured to execute a softswitch). In another embodiment, the server 110A comprises electronic circuits that are configured to provide the functionality of the switch 130A. A person having ordinary skill in the art will recognize that there are other ways for configuring the server 110A so that the server 110A provides the functionality of the switch 130A.

An endpoint enables a user to carry on a phone call. Although in the illustrated embodiment the first site 100A has three endpoints (one analog phone 121, one IP phone 122A and one softphone 123), in other embodiments the first site 100A has different numbers and types of endpoints. Examples of endpoints include a video conferencing device, a Multipoint Control Unit ("MCU"), a conference bridge, an Analog Terminal Adapter ("ATA"), and any other device that originates and/or terminates a media stream. An endpoint is coupled to the switch 130A, the server 110A, or both. Each of the endpoints can also include a display device (not shown) that is used in conjunction with the phone of the endpoint.

Figure 2:
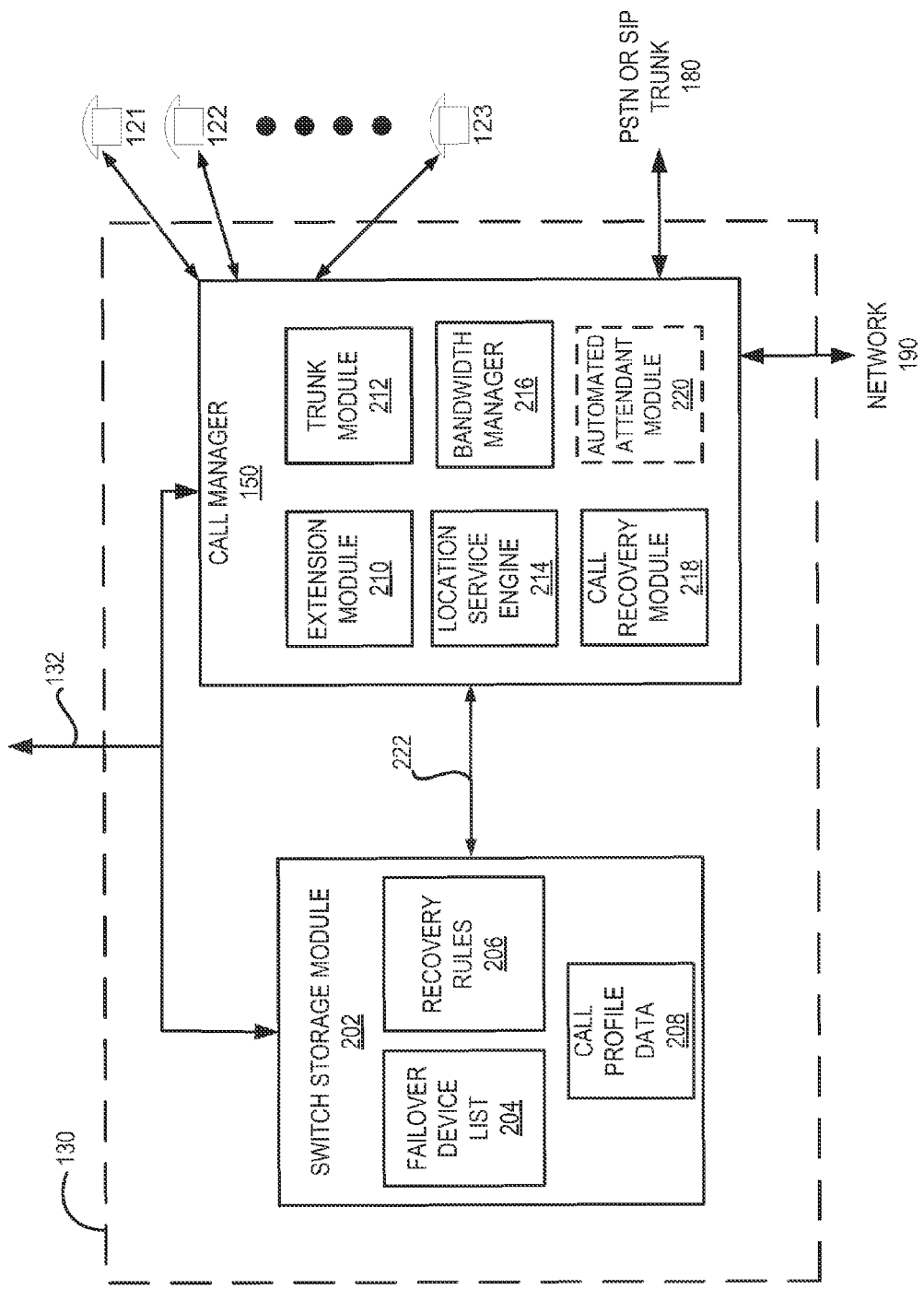
FIG. 2 is a high-level block diagram illustrating a switch according to one embodiment of the present invention.

In one embodiment, an endpoint is a conference bridge adapted to have the functionality of a switch 130A. For example, the conference bridge includes hardware that provides the conference bridge with the functionality of a switch 130A. Such hardware includes, for example, one or more electronic circuit boards, one or more processors and/or a non-transitory storage device (e.g., RAM, hard drive, etc.) storing data and/or software (e.g., a call manager as depicted in FIG. 2, element 150), and these components are configured to work together with the other components of the conference bridge so that the conference bridge has the functionality of a switch 130A. In another embodiment, the conference bridge has, among other things, a processor and a non-transitory storage device that stores a call manager that, when executed by the processor, causes the conference bridge to have the functionality of a switch 130A. For example, in one embodiment an endpoint is a conference bridge and the bandwidth manager and the settings manager are components of a call manager stored on a storage device that is comprised within the conference bridge.

In one embodiment, an endpoint has a user interface to send data to and receive data from a user. The analog phone 121A has, for example, a Telephone User Interface ("TUI") that sends data through a speaker and receives data through a microphone and a keypad. The IP phone 122A has, for example, both a TUI and a Graphical User Interface ("GUI") that sends data through a display device associated with the IP phone 122A. In one embodiment, the IP phone's graphical user interface also receives data from a touch screen display device associated with the IP phone 122A. The softphone 123A has, for example, a software application that runs on a computer and sends data through a display device and a speaker and receives data through a microphone, a keyboard and a pointing device.

The server 110A is configured to implement features or functions of the telephony system in accordance with the present invention. The server 110A is coupled to the network 190 and although not shown can also be coupled to one or more endpoints, such as IP phone 122A and softphone 123A. In one embodiment, the server 110A implements a server architecture according to one embodiment of the present invention. The server 110A is a hardware server and includes a processor (not pictured). The processor can be a conventional processing device, such as a general-purpose microprocessor. Server 110A also includes a non-transitory computer-readable memory ("the memory" or "a memory"). The memory includes program instructions or functional units that in one embodiment implement features of the present invention. Specifically, in one embodiment the memory includes a Telephony Management Software ("TMS") unit, a Telephony Application Programming Interface ("TAPI") unit and a directory unit. In one embodiment, the memory also includes one or more application units that interact with the TMS unit and the TAPI unit to enable a specific computer-integrated function. An application unit uses the TAPI unit to exchange data with the TMS unit. The TMS unit is able to communicate with and manage one or more switches 130. For example, with reference to FIG. 1, the TMS unit included in the server 110A can manage the switches 130A, 130B, 130C. Through the TAPI unit, the TMS unit presents an application with Computer-Telephony Integration ("CTI") view of these switches 130A, 130B, 130C. This allows the application to manage the switches 130A, 130B, 130C. Such switches 130A, 130B, 130C operate without an associated TMS unit if CTI features are not being used. The server 110A has a user interface to send data to and receive data from a user. The user interface interacts with TMS in order to allow a user with administrative rights to manage the switches 130A, 130B, 130C and change the configuration settings of the switches 130A, 130B, 130C. The user can access the user interface at the server 110 or at an endpoint (e.g., soft phone).

In one embodiment, the server 110A includes an application unit and/or a directory unit. The application unit assists the switch 130 in providing one or more phones communicatively coupled to the switch 130 with access to conventional PBX applications (e.g., among others, instant messaging, collaboration tools, sidebar conversations between two or more users during ongoing PBX calls, chat sessions between two or more users and/or APIs for integrating third party applications with the standard PBX functions provided by the switch 130). For example, the application unit is data and routines stored on a non-transitory computer-readable medium comprised within the server 110. In one embodiment, the server 110 does not include the application unit and the switch can provides PBX functionality without assistance from the switch.

In general, the directory unit enables a phone to access a directory and use the directory in conjunction with other phone functions. In one embodiment, the directory unit is implemented as a service that interacts with TMS unit. Communication or data exchange is between the TMS unit and the directory unit. The directory unit can be distributed among computing devices as is known to one of skill in the art. For example, the functionality enabled by directory unit can be implemented in a client-server fashion by having the client (user's local system, such as a general-purpose computer or endpoint) perform some functions and having the server 110 (directory unit) perform others. As another example, some or all of the functionality enabled by the directory unit can be implemented by having a switch 130 perform some or all functions.

The server 110A also stores an Interactive Voice Response module 111A "IVR 111A". The IVR 111A is computer code and routines stored on a non-transitory computer-readable medium (not pictured) comprised within the server 110A and executable by a processor (not pictured) of the server 110A (or comprised within the switch 130A) to provide users of second devices such as, for example, POTS phone 107 and/or mobile phone 108 with an automated and/or interactive communication experience. For example, in one embodiment a user of the mobile phone 108 is connected to the IVR 111A by the switch 130A. The IVR 111A greets the user and plays a script that prompts the user for answers to questions that are included in the IVR script. The user can answer the questions with verbal response inputs and/or keypad inputs to the mobile phone 108. The IVR 111A receives these inputs and moves to a different point in the IVR script responsive to these inputs. The user inputs are stored, for example, in a non-transitory memory such as storage device 140A and/or a memory comprised within the server 110A. A person having ordinary skill in the art will recognize additional functionality of the IVR 111A. The IVR 111A is described in further detail with reference to FIG. 4.

In one embodiment, the server 110A stores and executes an application (not pictured) having similar functionality as the IVR 111A. For example, the server 110A stores an application that performs similar or different functions as the IVR 111A and is adapted to function as a telephony device (e.g., a failover device, a first device) within the system 195. The application is computer code and routines stored on a non-transitory computer-readable medium (not pictured) comprised within the server 110A and executable by a processor (not pictured) of the server 110A (or comprised within the switch 130A) to provide users of the second device with an automated and/or interactive communication experience. For example, the application answers the call and plays music until the second device is transferred to a different failover device or until a user of the second device hangs up the call. A person having ordinary skill in the art will recognize that the application can have different functionality than those described in the above example. In one embodiment, the server 110A stores and executes the application and the IVR 111A. In another embodiment, the server 110A stores and executes one of the application and the IVR 111A.

The storage device 140A is a non-transitory computer readable medium that stores, for example, directory information. The directory information includes directory entries and associations between directories and phones. In one embodiment, the storage device 140A also includes information regarding which users have administrative rights to access the server's user interface and make changes to call failure rules that are stored, for example, in one or more switches (e.g., 130A, 130B, 130C) and/or one or more servers (e.g., 110A, 110B, 110C). For example, the storage device 140A will include the user name and password of users with administrative rights. A user having administrative rights can access the user interface of the server 110 and modify, add and/or delete the call failure rules.

In one embodiment, the storage 140A includes data that is accessed by the switches 130A, 130B, 130C in order to operate. For example, in one embodiment, the storage 140A includes data described with reference to FIG. 2 as stored in the switch storage module 202. In the illustrated embodiment, the storage device 140 is directly coupled to the server 110. In an alternate embodiment, the storage device 140 is coupled to the server 110 via the network 190.

One skilled in the art will appreciate that additional networking devices (not shown) can be added to the first site 100A, for example, if needed to support additional endpoints, servers 110A, switches 130A or other systems. For example, the first site 100A can include a second switch 130 and an edge router to couple the first site 100A to the network 190 and to provide local area connectivity for the first and second switches 130. One skilled in the art will also recognize that numerous configurations of switches 130 and communication links are contemplated. For example, PSTN links can be coupled to multiple switches 130 at several points within the topology and soft-switches can also be used.

The second site 100B includes: endpoints (analog phone 121B, 1P phone 122B, software phone 123B); a switch 130B; a server 110B; and a storage device 140B. The third site 100C includes: endpoints (analog phone 121B, 1P phone 122B, software phone 123B); a switch 130B; a server 110B; and a storage device 140B. The elements of the second site 100B and the third site 100C work similar to the elements of the first site 100A described above, and so, that description will not be repeated here. Similar elements have similar reference numerals.

Switch 130

Referring now to FIG. 2, an embodiment of the switch 130 according to one embodiment of the present invention is shown. The depicted switch 130 is similar to switches 130A, 130B and 130C described above for FIG. 1. In this embodiment, switch 130 is configured to implement features or functions of the present invention. In one embodiment, the switch 130 includes one or more processors (not shown). The processor can be a conventional processing device, such as a general-purpose microprocessor. In a different embodiment, the switch 130 does not include a processor but is instead controlled by a processor comprised within a server 110 at the same site 100 and/or a server 110 at a different site 100. Switch 130 also includes a non-transitory computer readable memory. The memory stores software and routines (not shown) conventionally used to operate a switch 130 in a VoIP telephony system. For example, the switch 130 includes software routines for performing call monitoring, transferring calls, placing calls on hold, establishing hunt groups, automated attendant functions, etc. The memory also stores program instructions or functional units that implement the features of the present invention. The switch 130 also includes a switch storage module 202 and a call manager 150.

The switch storage module 202 is for storing information utilized by the call manager 150 to perform its functions. The switch storage module 202 is communicatively coupled to the call manager 150 via coupling 222. In one embodiment, the switch storage module 202 is a portion of the memory of the switch 130. The storage module 202 stores: a failover device list 204; one or more recovery rules 206; and call profile data storage module 208.

The failover device list 204 includes a list of one or more failover devices. A failover device is an endpoint to which a call can be rerouted to if a call failure event is detected by the call manager 150. For example, the failover device list 204 includes one or more analog phones (e.g., 121A, 121B, 121C), IP phones (e.g., 122A, 122B, 122C), software phones (e.g., 123A, 123B, 123C) and IVRs (e.g., 111A, 111B, 111C). In one embodiment, failover device list 204 includes one or more switches (e.g., 130A, 130B, 130C) having one or more automated attendant modules 220. Thus, in one embodiment, a switch 130 storing an automated attendant module 220 is an endpoint. In one embodiment, the failover device list 204 is prioritized and calls are rerouted to an available failover device having the highest priority ranking in the list 204. For example, the list 204 is prioritized based on which of the failover devices is closest to the switch 130 upon which the call is initially terminated. A person having ordinary skill in the art will recognize that other prioritization schemes are possible.

The recovery rules 206 are a list of rules for recovering calls when a call failure event is detected or predicted by the call manager 150. The term "recovering calls" means to reroute the call to a failover device so that the call continues for the user of the second device 107, 108. Recovery rules specify how a call is rerouted upon detection of a call failure event.

The recovery rules 206 can be either static or dynamic. Dynamic recovery rules are either call specific or device specific. A call specific rule applies only to a particular call. A device specific rule applies to all calls for the given device (either first device or second device). Dynamic rules are determined when (1) the call is initially connected or (2) after a call failure event occurs. Dynamic recovery rules are described in further detail with reference to the dynamic rule module 314 (discussed below with reference to FIGS. 3 and 4). In one embodiment, when both a dynamic rule and a static rule is applicable to a given call, the dynamic rule takes priority over the static rule so that the dynamic rule is applied by the call manager 150 and the static rule is not applied by the call manager 150.

Static recovery rules are default rules for handling calls responsive to call failure events. In one embodiment, static recovery rules are pre-loaded on the switch 130. In another embodiment, static recovery rules are determined by the call manager 150 after the switch 130 is installed into the system 195. In one embodiment, static recovery rules are not call specific. For example, in one embodiment the list of recovery rules includes the static rule that when a call failure event is detected by the call manager 150, the call manager 150 reroutes the call to the highest priority switch 130 that is both (1) available and (2) has an automated attendant module 220 comprised within the switch 130. The automated attendant module 220 then greets and informs the user of the error and/or options for reconnecting the call. The automated attendant module 220 is discussed in further detail below. Additional examples of static and dynamic recovery rules are described for FIGS. 5A-5F. A person having ordinary skill in the art will recognize that other recovery rules are possible.

In one embodiment, devices having administrative rights can access the interface of the server 110 to specify different static recovery rules and different criteria for determining dynamic recovery rules. In one embodiment, only one of static rules and dynamic rules are stored in the rules list 206. In another embodiment, both static rules and dynamic rules are stored in the rules list 206. A device having administrative rights is a telephony device (e.g., and endpoint such as the server 110A, 110B, 110C) that is configured to add, delete or modify static recovery rules and different criteria for determining dynamic recovery rules. The administrative rights can be device-specific or user-specific. For example, a device has device-specific administrative rights if the device itself has a persistent token, cookie or some other persistent identifier that grants the device administrative rights. A device has user-specific administrative rights, for example, if the device has administrative rights because a human user of the device entered a password or code into the device that resulted in the device being assigned a temporary token or cookie providing the device temporary administrative rights.

The call profile data storage module 208 stores data describing the calls terminated on the switch 130. For example, the call profile data 208 describes one or more of: (1) the user's progress through the IVR script (i.e., the last prompt answered by the user); (2) the inputs provided by the user responsive to the prompts in the script; (3) information describing the first device that is a party to the call; (4) information describing the second device that is a party to the call; and (5) information describing the call quality experienced by the user during the call. Persons having ordinary skill in the art will recognize that other call profile data are possible. In one embodiment, devices having administrative rights can access the interface of the server 110 to specify different call profile data that should be collected and stored for calls.

The storage module 202 and call manager 150 are coupled by a signal line 132 to the server 110. In one embodiment, the signal line 132 is one of a wired connection or wireless connection. For example, the signal line 132 is a wireless connection such as a LAN. The server 110 uses the signal line 132 to download information to the configuration storage module 202 and call manager 150. The information downloaded by the server 110 includes the information noted above to allow the call manager 150 to perform its functions. In accordance with the present invention, the server 110 also uses signal line 132 to transmit dynamic recovery rules to the call manager 150 in embodiments where the dynamic rules are determined by a dynamic rule module 320 comprised within the server 110 (discussed with reference to the dynamic rule module 320 shown in FIG. 4).

A device, such as the processor of the switch 130, runs the call manager 150 software application and is coupled to and controls one or more endpoints (e.g., 121, 122 and 123) with which it is associated. While shown as operational and as part of the switch 130 in FIG. 2, those skilled in the art will recognize that in other embodiments, the call manager 150 may be operational as a separate module in a site 100 or as part of a server 110.

Although in the illustrated embodiment each site 100 has only one call manager 150 in the switch 130, in other embodiments the site 100 has a different number of call managers 150. Also, more than one call manager 150 can control the same endpoint. The association between a call manager 150 and an endpoint that it controls is accessed through the server 110. Furthermore, although not shown, the second switch 130 includes its own call manager 150.

In one embodiment, the trunk 180 is a SIP trunk and provides connectivity to SIP-compatible devices. One having ordinary skill in the art will recognize that network 190 also provides connectivity for SIP-compatible devices.

As shown in FIG. 2, the call manager 150 is coupled to the PSTN or SIP trunk 180 and the network 190. The call manager 150 comprises: an extension module 210; a trunk module 212; a location service engine 214; a bandwidth manager 216; a call recovery module 218; and an automated attendant module 220. Here, the automated attendant module 220 is depicted by a rectangle formed from a hashed line to indicate that it is an optional feature of the call manager 150.

The extension module 210 communicates with endpoints coupled to the call manager 150 in order to allow a user to perform call-related functions on an endpoint. In addition, the extension module 210 is used to communicate with other call managers 150 in the telephony system 195.

The trunk module 212 is coupled to and controls the interaction between the endpoints 121, 122 and 123 and the PSTN or SIP trunk 180. In particular, the call manager 150/switch 130 is often coupled to a trunk line. The trunk module 212 of the call manager 150 manages the usage of the trunk line by multiple endpoints 121, 122 and 123 optimizes the usage of the trunk line. The trunk module 212 also manages trunk services such as caller identification, direct inward dial, etc.

The location service engine 214 resolves the dialed numbers (converts raw dialed digits into routable contacts) and routes the call to the destination endpoint such a phone, trunk, hunt group, auto attendant, pickup group etc.

The bandwidth manager 216 is coupled to the network 190 and allocates bandwidth necessary to support calls handled by the call manager 150. The call recovery module 218 is described with reference to FIG. 3.

The automated attendant module 220 is a conventional automated attendant that receives calls, provides the user with one or more of a greeting, an explanation for a dropped call and instructions for reconnecting the call.

In one embodiment, one or more of the above described components of the call manager (i.e., the extension module 210, trunk module 212, location service engine 214, bandwidth manager 216, call recovery module 218 and automated attendant module 220) are codes and routines stored on a memory comprised within the switch 130 and executable by the switch's processor to provide the functionality described above.

In another embodiment, one or more of the above described components of the call manager 150 are a specialized hardware devices configured to perform the function of the particular components. For example, one or more of the extension module 210, trunk module 212, location service engine 214, bandwidth manager 216, call recovery module 218 and automated attendant module 220 is a combination of one or more electronic circuit boards configured to provide the above-described functionality for that component. In one embodiment, the one or more electronic circuit boards that comprise the component include one or more of: (1) a processor; (2) a non-transitory computer-readable memory (e.g., RAM, a hard-drive, a buffer, a circular buffer, etc.) communicatively coupled to the processor; and (3) processor-executable firmware stored on the non-transitory memory.

Figure 3:
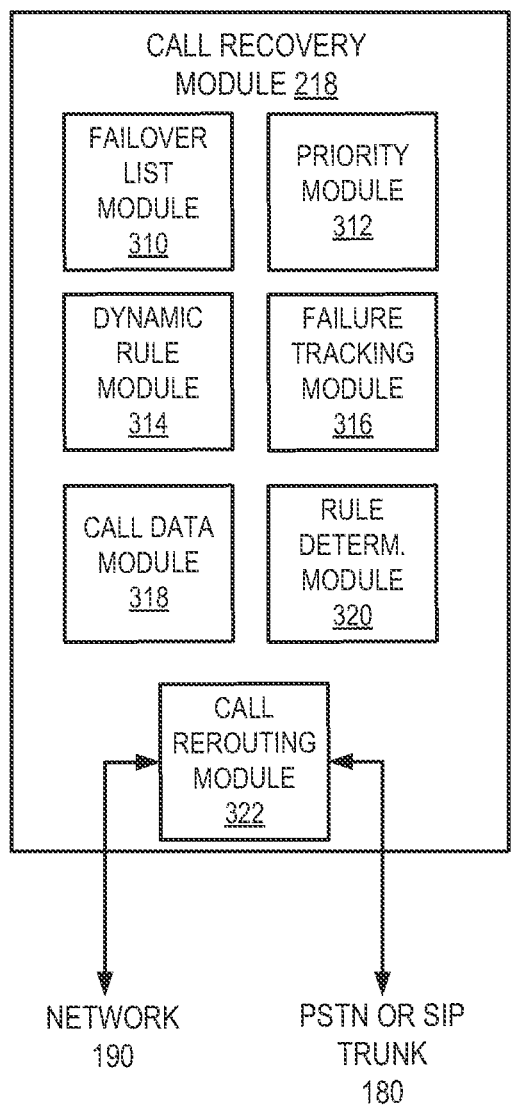
FIG. 3 is a block diagram illustrating a call recovery module according to one embodiment of the present invention.

FIG. 3 shows a call recovery module 218 according to one embodiment. The call recovery module 218 comprises: a failover list module 310; a priority module 312; a dyamic rule module 314; a failure tracking module 316; a call data module 318; a rule determination module 320; and a call rerouting module 322.

The failover list module 310 interrogates the telephony system 195 to determine one or more failover devices and stores an indication of the failover devices in the failover device list 204. In one embodiment, the interrogation performed by the failover list module 310 also identifies an auto-attendant or IVR comprised within the failover device. In one embodiment, the failover list module 310 also determines the proximity of the different failover devices and/or mapping information for the failover devices. The proximity information is stored is stored in the failover device list and used by the call recovery module 218 to prioritize the failover device list 204. For example, failover devices that are closer to the switch 130 upon which the call is terminated are prioritized higher in the failover device list. The mapping information is stored in the failover device list 204 and used by the call recovery module 218 to reroute failed calls to the failover devices indicated by the failover device list 204.

A failed call is a call for which a communicative connection between one or more switches 130A, 130B, 130C and another endpoint is either lost or deteriorated to a predefined unacceptable level. A call includes at least one switch 130A, 130B, 130C and any number of endpoints. For example, a call includes a POTS phone 107 and an IP phone 122A, 122B, 122C connected via a single switch 130A, 130B, 130C. A person having ordinary skill in the art will recognize that the call can be connected using more than one switch 130A, 130B, 130C. In one embodiment, the switch 130A, 130B, 130C is comprised within a conference bridge. A communicative connection is a state in which communicative signaling occurs between any number of switches 130A, 130B, 130C and an endpoint. The communicative signaling is the signaling that occurs between an endpoint and at least one switch in order to connect and maintain a call with another endpoint. In general, a two-party call has two communicative connections, a three-party call has three communicative connections and so on. A communicative connection is also referred to as a call leg. For example, for a two-party call between a first endpoint and a second endpoint, a first communicative connection exists between the first endpoint and a first switch 130A, 130B, 130C and a second communicative connection exists between a second endpoint and the first switch 130A, 130B, 130C. A failed call occurs if a first endpoint hangs up since the first communicative connection is lost responsive to the hang up. A person having ordinary skill in the art will recognize that different switching topologies are possible, and that the example described-above is not intended to limit the scope of the above-described embodiment.

The priority module 312 ranks the devices in the failover device list 204 in a priority order. In one embodiment, the priority module 312 retrieves the proximity information and prioritizes the failover devices included in the failover device list 204 based on a proximity relative to the switch 130 upon which the call is originally terminated. A person having ordinary skill in the art will recognize that other prioritization schemes are possible. For example, failover devices that have historically had better call quality are prioritized higher in the failover device list 204 versus failover devices having historically poorer call quality.

The dynamic rule module 314 determines and updates dynamic recovery rules that are stored in the rules list 206. In one embodiment, the dynamic rule module 314 determines dynamic recovery rules either on (1) a call-by-call basis or (2) a device-by-device basis. For example, the dynamic rule module 314 analyzes data for the call (for example, the call profile data 208) and determines dynamic recovery rules for the call based on this data or a subset of this data. The dynamic rule module 314 determines dynamic recover rules based on one or more of: (1) the identity of the trunk on which the first device is terminated; (2) the telephone number of the first device; (3) the telephone number of the second device; (4) the availability of an IVR 111; (5) the number of calls currently connected system wide; (6) the recent performance of the network 190 (e.g., whether recent network 190 performance indicates that network failure is likely); (7) a distance between the site 100 which the first device belongs to and the other sites 100; (8) the number of human operators available to take a failover call; and (9) a particular IVR 111 to which the second device is originally connected for the certain mandatory prompts. A person having ordinary skill in the art will recognize that other factors can be considered by the dynamic rule module 314 when determining dynamic rules.

In one embodiment, the dynamic rules for a specific call change over time. Thus, the dynamic rule module 314 can determine more than one dynamic rule for any specific call and the dynamic rule for a call can change over time. In one embodiment, how and when the dynamic rule for a specific call changes is specific to an IVR 111 to which the first device is originally connected. For example In one embodiment, dynamic rules that are applied on a call-by-call basis only apply to a particular call. For example, for a particular call, the call is connected to an IVR 111 application (e.g., a Contact Center or Call Center application that provides customer support) and the user of the second device is provided with certain mandatory prompts from the IVR script. A first communicative connection is present between the second device and a first switch 130 and a second communicative connection is present between the switch 130 and the IVR 111. After the second device is connected to the IVR 111, the dynamic rule module 314 works with the rule determination module 320 and the failover device list 204 to determine: (1) whether the failover device list 204 includes a first device that is within a predetermined proximity to the switch 130; (2) the priority ranking of each of these devices; and (3) whether one or more of these devices are available for a failover call. Of the available devices that are within the predetermined proximity, the rule determination module 320 identifies the highest ranked device as the failover device (i.e., "the determined failover device"). The dynamic rule module 314 then determines the dynamic recovery rule that, for this particular call, if a call failure occurs the second device will be connected to the determined failover device. In one embodiment, the dynamic rule module 314 determines the dynamic recover rule that the failover device will build a new communicative connection (e.g., a new call leg) between the second device and the failover device responsive to the determined call failure event. In other words, the dynamic recovery rule indicates that a third call connection will be built between the switch 130 and the failover device so that the second device is connected on a call with the failover device.

In one embodiment, dynamic rules that are applied on a device-by-device basis apply to: (1) all devices of a same type; (2) one or more devices at a same site 100A, 100B, 100C; or (3) all devices of a particular type when the call occurs during a predefined period of time. A person having ordinary skill in the art will recognize that there are other ways for applying dynamic rules on a device-by-device basis. For example, dynamic rule module 314 determines a particular dynamic rule applies to all calls in which the first device is an IVR 111, and, for any type of call failure occurring for call connected to the IVR 111, the second device is connected to an automatic attendant (e.g., module 220 depicted in FIGS. 2 and 4) that will provide the user of the second device with a prompt that explains the reason for the call failure (such as, "Your call was interrupted due to a network timeout."). Examples of static and dynamic recovery rules are provided with reference to FIGS. 5A-5F.

In one embodiment, the dynamic rule module 314 determines dynamic recovery rules either on (1) a call-by-call basis or (2) a device-by-device basis. For example, the dynamic rule module 314 analyzes data for the call (for example, the call profile data 208) and determines dynamic recovery rules for the call based on this data or a subset of this data. The dynamic rule module 314 determines dynamic recover rules based on one or more of: (1) the identity of the trunk on which the first device is terminated; (2) the telephone number of the first device; (3) the telephone number of the second device; (4) the availability of an IVR 111; (5) the number of calls currently connected system wide; (6) the recent performance of the network 190 (e.g., whether recent network 190 performance indicates that network failure is likely during the call); (7) a distance between the site 100 which the first device belongs to and the other sites 100; (8) the number of human operators available to take a failover call; (9) a particular IVR 111 to which the second device is originally connected for the mandatory prompts; (10) the time at which the call began; (11) the time at which a call failure is detected; (12) an account code for the call; (13) input provided by a first user of the first device indicating that the second user of the second device should receive better treatment than other users; and (14) call processing data saved in the call profile data 208. A person having ordinary skill in the art will recognize that other factors can be considered by the dynamic rule module 314 when determining dynamic rules.

In one embodiment, the dynamic rules for a specific call change over time. Thus, the dynamic rule module 314 can determine more than one dynamic rule for any specific call and the dynamic rule for a call can change over time. In one embodiment, how and when the dynamic rule for a specific call changes is specific to the IVR 111 to which the first device is originally connected for the mandatory prompts and one or more other factors described in the paragraph immediately above with reference to the dynamic rule module 314. For example, for a given call, the determined dynamic rule is based on the IVR 111 to which the first device was originally connected to for the mandatory prompts and the identity of the trunk on which the first device is terminated.

In one embodiment, the dynamic rule module 314 determines the failover device based on current call processing data saved in the call profile data 208. The call processing data and the call profile data 208 are stored in a non-transitory computer readable storage medium, e.g., the switch storage 202. For example, there are multiple first devices and the first devices are telephony devices in a call center used by first users (e.g. sales agents, customer service agents, etc), the different first devices are assigned to different groups (e.g., the sales group, the customer service group, etc.) and the second device is a telephony device used by a second user (e.g., a customer) connected on a call with the call center. The call profile data contains information such as (1) an identity of the second user of the second device that is on the call, (2) which group this call belongs to and (3) which first user of the first device the second user of the second customer had talked to. The dynamic rule module 314 determines dynamic rules based on (1) the identity of the second user (e.g., (a) how important this customer is, (b) whether this customer is on a critical account list), (2) the group the call belongs to (e.g., (a) a call to a sales group that is likely to represent a sales opportunity, (b) a call to a customer service group that is likely to involve a request for customer support) and (3) the identity of the first user (e.g., does the first user have an assistant that can help the first user).

In another embodiment, as the second user of the second device works through the IVR script (e.g., provides answers to the IVR prompts) the dynamic rule module 314 determines a new dynamic rule based on input provided by the second user responsive to the IVR prompts. For example, if the second user provides an answer indicating that the second user is an important person, the dynamic rule module 314 determines a new dynamic rule that gives the second user better treatment, e.g., the new dynamic rule generated by the dynamic rule module 314 indicates that the second device is connected to a human user of an IP phone 122 instead of an automated attendant in the event of a call failure.

In another embodiment, the dynamic rule module 314 changes the dynamic rule based on input provided by a first user of the first device. For example, the first user is a human sales representative that works in a sales group (as described above) and the second user is a potential client. The first user is making cold sales calls. The second user agrees to a sale, and the first user provides an input indicating that the second user should receive different treatment in the event of call failure. The dynamic rule module 314 determines a new dynamic rule responsive to the input provided by the first user, e.g., the new dynamic rule generated by the dynamic rule module 314 indicates that the second device is connected to a human user of an IP phone 122 instead of an automated attendant in the event of a call failure.

The failure tracking module 316 tracks calls for call failures. Call failures include network quality failures, network error failure, first device hang-up failures and bandwidth failures. A network quality failure occurs when (1) packet losses reach or exceed a predetermined threshold and/or (2) packet latency exceeds a predetermined threshold. A network error failure occurs when there is a loss of network connectivity between: (1) one or more switches 130 and the network 190 (or the devices on the network 190, e.g., IP phone 122, software phone 123, IVR 111, etc.); and/or (2) one or more servers 110 and the network 190 (or the devices on the network 190, e.g., IP phone 122, software phone 123, IVR 111, etc.). A network error failure also occurs, for example, when the connection times out between the switch 130 and the network 190 (or the devices on the network 190, e.g., IP phone 122, software phone 123, IVR 111, etc.) and/or the server and the network 190 (or the devices on the network 190, e.g., IP phone 122, software phone 123, IVR 111, etc.). A first device hang-up error occurs when the first device that is a party to the call hangs-up. A bandwidth failure occurs when there is insufficient bandwidth to sustain the call. The failure tracking module 316 is communicatively coupled to provide the functionality described above. A person having ordinary skill in the art will recognize that devices such as the IP phone 122, software phone 123 and the IVR 111 are referred to herein as being "on the network 190" since, in one embodiment, they are communicatively connected (wired or wireless, e.g., via a LAN) to send and receive data and/or information either directly or indirectly via the network 190.

A person having ordinary skill in the art will recognize that call failure events can be referred to as failed calls. For example, the failure tracking module 316 monitors for failed calls (e.g., insufficient bandwidth available on the network 190) and signals to indicate a call failure event responsive to a detected failed call. In one embodiment, the failure tracking module 316 stores the historical call quality data in a memory such as the switch storage module 202.

The rule determination module 320 determines which rule to apply to a call when a call failure event occurs. If both a static rule and a dynamic rule apply, the rule determination module 320 applies the dynamic rule. In one embodiment, the rule determination module 320 is communicatively coupled to the switch storage module 202, the failure tracking module 316 and the call rerouting module 322. The rule determination module 320 retrieves rules from the switch storage module 202 and determines a failover device for the call based on the rules and the failover device list. The rule determination module 320 selects one or more of the rule to apply to the call and the failover device (1) before a call is connected, (2) cotemporaneous with connecting the call or (3) after a call failure event is detected by the failure tracking module 316. The rule determination module 320 selects the rule and the failover device at different times. In one embodiment, the rule determination module 314 accesses mapping information from the switch storage 202 and sends the mapping information for the failover device to the call rerouting module 322 so that the call rerouting module 322 sends call profile data to the failover device and connect a new communicative connection between the second device and the failover device responsive to receiving, from the failure tracking module 316, an indication that a call failure event has occurred.

The call rerouting module 322 transmits the call recovery rule and the call profile data to the failover device and sends invites to a switch 130 or server 110 communicatively coupled to the failover device in order to connect a new communicative connection between the second device and the failover device responsive to a call failure event. In one embodiment, the failover device uses the call recovery rule and/or the call profile data to connect a new communicative connection with the second device if the switch 130 upon which the call was initially terminated (or some other endpoint associated with the initial call) experiences a call failure. For example, if the second device is initially connected on a call with IP phone 122B and then one or more of the IP phone 122B, switch 130B or server 110B experience a call failure event, assuming IP phone 122A is the failover device and has received the call recovery rule from the switch 122B, IP phone 122A connects a new communicative connection with the second device even though IP phone 122B, switch 130B, and/or server 110B are no longer connected to the network 190.

In one embodiment, the call rerouting module 322 is communicatively coupled to the rule determination module 320, the failure tracking module 316, the network 190 and the PSTN (or SIP trunk) 180.

The call rerouting module 322 receives the call recovery rule from the rule determination module 320. In one embodiment, the rule determination module 320 stores the determined recovery rule in the call profile data 208 stored on switch storage 202, and the call rerouting module retrieves the call recover rule from the switch storage 202. The call rerouting module 322 retrieves the call recovery rule at the same time or a different time as when it retrieves the call profile data. The call rerouting module 322 sends the call recovery rule to the failover device at the same or a different time as when it sends the call profile data. In one embodiment, the call rerouting module 322 only sends the recovery rule to the failover device once, and sends call profile data to the failover device two or more times.

The call rerouting module 322 retrieves call profile data from the switch storage module 202. In one embodiment the call rerouting module 322 transmits all the call profile data to the failover device at one or more intervals. In one embodiment an interval is a predetermined time period or a predetermined point in an IVR script. For example, the call rerouting module 322 retrieves the call profile data for the call and transmits all of the call profile data for the call to the failover device at each interval.

In one embodiment, the transmission of call profile data to the failover device is optimized to minimize the impact on the network 190 bandwidth. For example, the call data module 318 is adapted to receive an indication that the user of the second device has provided input responsive the IVR script. The call rerouting module 322 is communicatively coupled to the call data module 318 and the call data module 318 signals the call rerouting module 322 when the user provides a new input responsive the IVR script. The call rerouting module 322 receives this input from the call data module 318 and retrieves only the call profile data added since the last time the user provided an input. This portion of the call profile data is referred to as "the delta of the call profile data," and the process of the call rerouting module 322 retrieving only the call profile data added since the last user input is referred to as "retrieving the delta of the call profile data." The call rerouting module 322 then transmits the delta of the call profile data to the failover device.

Upon detecting a call failure, the failure tracking module 316 signals a call failure event to the call rerouting module 322. The call rerouting module 322 then builds a new communicative connection between the second device and the failover device by sending an invite to the failover device. The failover device uses the call profile data to continue the call.

It will be understood to persons having ordinary skill in the art that the terms "invitation," "invite" or "invite message" are not intended to limit the scope of the disclosure to devices that use session initiation protocol ("SIP"). Instead, the communication agents (e.g., call manager 150, server 110, etc.) described herein can use SIP, H.323, Media Gateway Control Protocol, Simple Gateway Control Protocol and/or protocols that are predecessors, successors, derivative and/or similar to any of these protocols. For example, in one embodiment the apparatuses and methods described herein use a proprietary protocol based on SIP (i.e., a protocol that is a derivative of SIP). In another embodiment, different communication agents use different protocols, and the call manager 150 includes conventional technology for translating communications between the different protocols.

Figure 4:
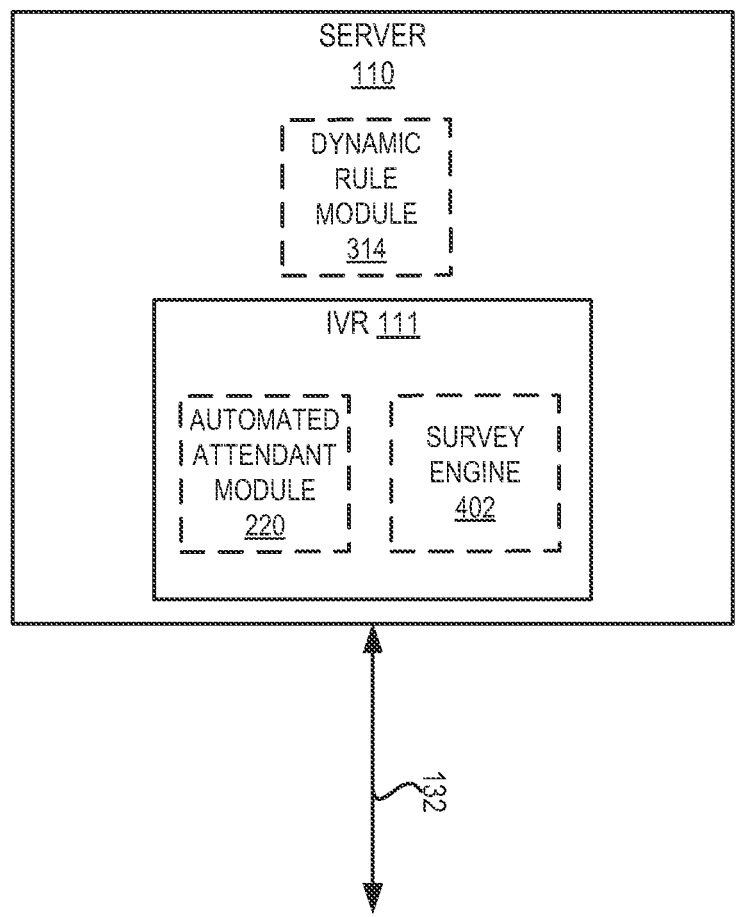
FIG. 4 is a high-level block diagram illustrating the server of FIG. 1 according to one embodiment of the present invention.

FIG. 4 depicts the server 110 according to one embodiment. The depicted server 110 is similar to servers 110A, 110B and 110C described above for FIG. 1. The server 110 is communicatively coupled to the switch 130 via signal line 132. The server 110 comprises an IVR module 111. In one embodiment, the server 110 also comprises a dynamic rule module 314. The dynamic rule module 314 operates as described for FIG. 3, except here the rules are transmitted to the switch storage 202 via signal line 132. In one embodiment, if the dynamic rule module 314 is comprised within the server 110, then the dynamic rule module 314 is not also comprised within the switch 130.

In another embodiment, the server 110 comprises an automated attendant 220. The automated attendant has the same functionality as described above for FIG. 2.

In another embodiment, the server 110 comprises a survey engine 402 which prompts the user of the second device with questions. The questions are part of a survey script. In one embodiment, the user of the second device provides answers to the questions and the answers are stored, by the survey engine 402, in tangible non-transitory computer readable memory, such as a memory comprised within the server 110 (e.g., RAM or a hard-drive).

EXAMPLES

FIGS. 5A-5F depicts several example call recovery rules according to one embodiment of the present invention. In one embodiment, one or more these rules are static recovery rules and/or one or more of these rules are dynamic recovery rules. The rules depicted in FIGS. 5A-5F are depicted in a human-readable form. However, in one embodiment these rules are encoded in a computer-readable form. For example, the rules are encoded as computer-code that is stored on a processor and executable by a processor.

FIG. 5A depicts a table 595A showing a first call recovery rule according to one embodiment of the present invention. In the depicted embodiment, the first call failure rule is a dynamic recovery rule. The first column 510 of the table shows a first call description 520, the second column 512 shows a first call failure description 522, the third column 514 shows a first failover device 524 and the fourth column 516 shows a description of a first recovery rule 526.

Figure 5B:
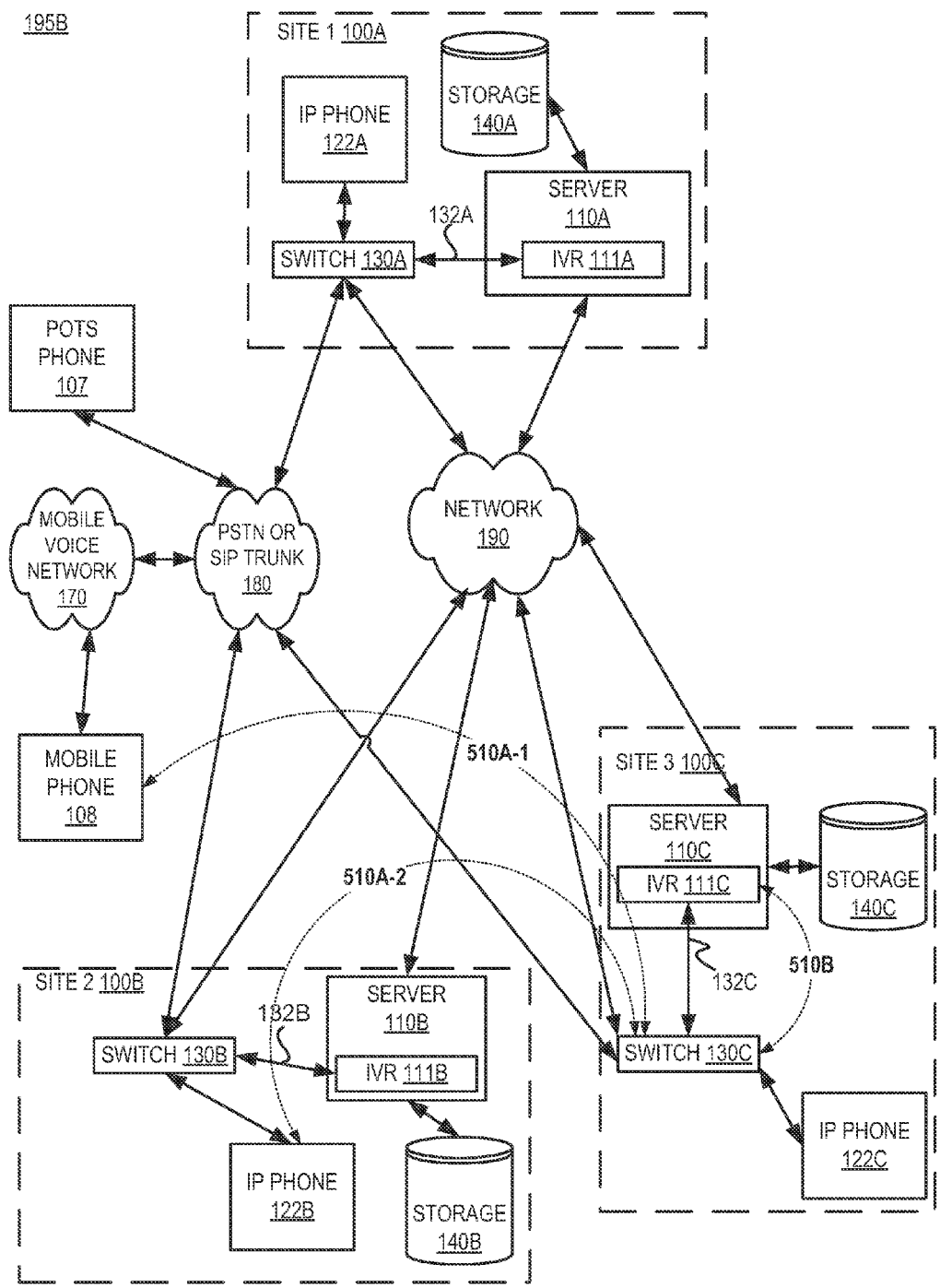
FIGS. 5B, 5D and 5F are high-level diagrams illustrating a functional view of a distributed telephony system according to one embodiment of the present invention.

The first call description 520 describes the call prior to a call failure event. Here, the call description 520 describes a second device connected on a call with a first device. For example, the mobile phone 108 is connected to IVR 111B for a number of mandatory prompts, and is then connected on a call with IP phone 122B (as shown in FIG. 5B). The user of IP phone 122B is a live person in a Contact Center interacting with the user of the mobile phone 108. The first call failure description 522 that triggers the first recovery rule 526 is a hang-up failure. The failover device 524 is a specified IVR. In this example, the rule determination module 320C comprised within the switch 130C determines that the failover device list 204 specifies IVR 111C as the failover device (see FIG. 5B) since it is the highest priority failover device that is available. In other words, in this example proximity is not considered by the call recovery module 218 when determining the failover device. In other embodiments proximity is considered. Thus, the dynamic rule module 314C comprised within the switch 130C determines a dynamic recovery rule 526 that indicates that if an first device (e.g., IP phone 122B) hangs up on the second device (e.g., mobile phone 108), the call manager 150C recovers the call by building a new communicative connection between the second device (e.g., mobile phone 108) and the specified IVR (e.g., IVR 111C). The user of the second device (e.g., mobile phone 108) is connected to a post-call survey at the specified IVR (e.g., IVR 111C). In one embodiment the post-call survey greets the user and then asks the user questions and prompts the user for answers to these questions. For example, in the post-call survey the user is asked questions about the user experience that led to the call failure and the user is prompted to provide answers about this experience.

FIG. 5B depicts a high level block diagram of the system 195B applying the rule described above for FIG. 5A according to one embodiment of the present invention. Here, FIG. 5B depicts elements similar to those described above for FIG. 1, so that description will not be repeated here. Like elements have like reference numerals.

Mobile phone 108 transmits a signal 510A-1 through mobile voice network 170 and PSTN (or SIP trunk) 180 that terminates at the switch 130C. The mobile phone 108 is connected for a period of time to the IVR 111C that plays a number of mandatory prompts. After the mandatory prompts are completed, the switch 130C transmits a signal 510A-2 connecting the call with IP phone 122B. The user of the mobile phone 108 interacts with the user of the IP phone 122B. The rule determination module 320C comprised within the switch 130C determines that IVR 110C is the failover device for this call. The call rerouting module 322C comprised within the switch 130C periodically transmits call profile data to the IVR 111C (or server 110C via switch 130C). In one embodiment, the recipient of the call profile data stores the call profile data for later use and, when the call failure event occurs, the call profile data is used to rebuild the call and/or to continue the call with the second device so that no call failure event is evident to the user of the second device. The dynamic rule module 314C comprised within the switch 130C determines the recovery rule 526 described for FIG. 5A and, upon failure tracking module 316C detecting a hang-up by phone 122B, the call rerouting module 322C transmits a signal 510B with an invite message to the server 110C. The call manager 150C comprised within the switch 130C works with the server 110C to build a new communicative connection between IVR 111C and the mobile phone 108.

FIG. 5C depicts a table 595B showing a second call recovery rule according to one embodiment of the present invention. In the depicted embodiment, the second call recovery rule is a static call failure rule. The first column 510 of the table shows a second call description 530, the second column 512 shows a second call failure description 532, the third column 514 shows a second failover device 534 and the fourth column 516 shows a second recovery rule 536.

Figure 5D:
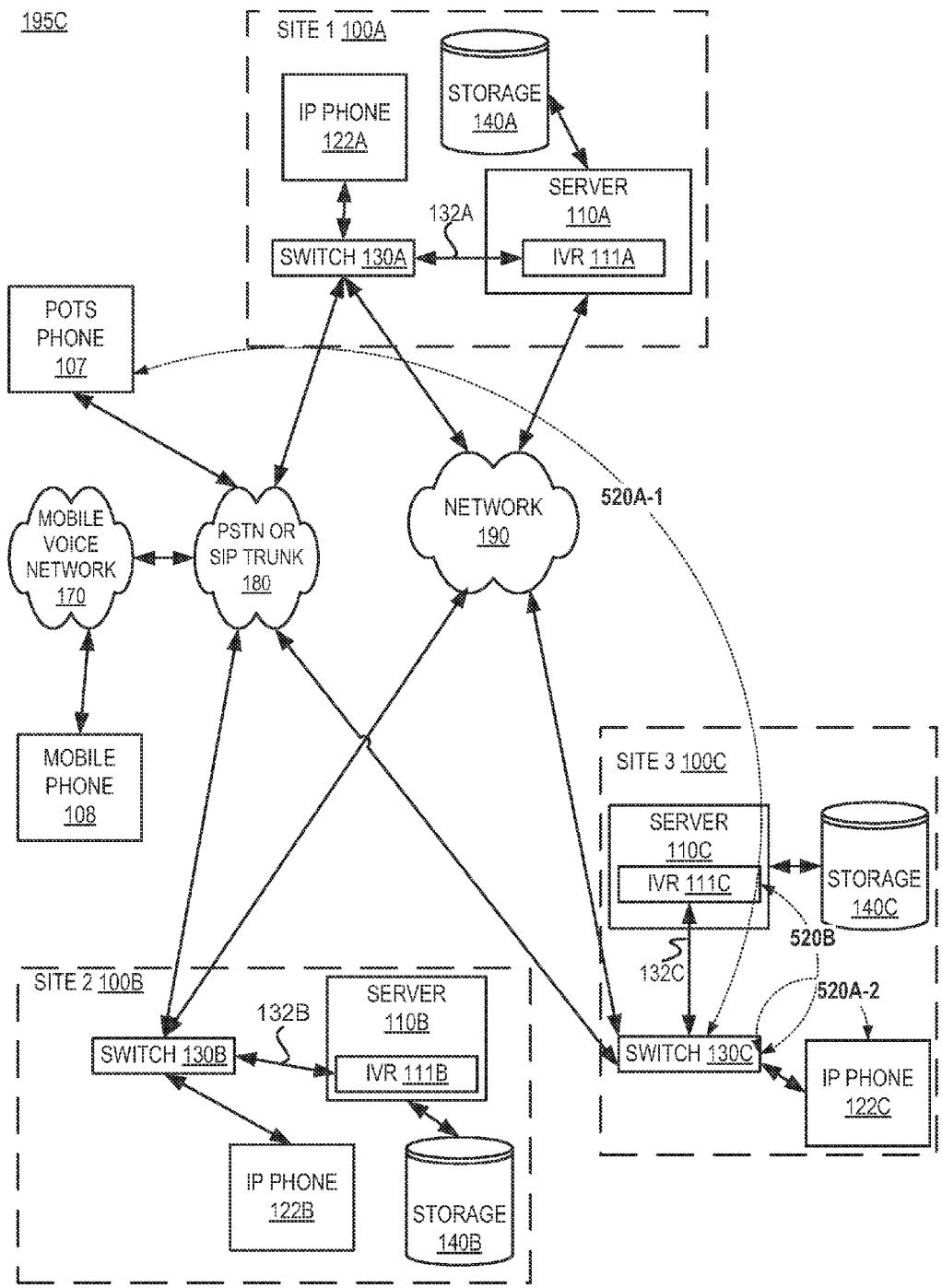

The second call description 530 shows a second device connected on a call with a first device. For example, the POTS phone 107 is connected to the IVR 111C for a mandatory number of prompts, and is then connected on a call with IP phone 122C (as shown in FIG. 5D). The second call failure description 532 that triggers the second rule 536 is a network error failure. For example, the connection between the switch 130C and the network 190 (or the devices on the network 190) times out. The rule determination module 320C comprised within the switch 130C determines that the second failover device 534 is a specified IVR. In this example, the rule determination module 320C determines that the failover device list 204 specifies IVR 111C as the failover device (see FIG. 5D). The rule determination module 320C determines that the recovery rules 206 includes a static rule 526 that indicates that if a first device (e.g., IP phone 122C) experiences a network error, the call manager 150 recovers the call by building a new communicative connection between a specified IVR (e.g., IVR 111C) and the switch 130C so that: (1) the second device (e.g., POTS phone 107) is connected on a call with the specified IVR; and (2) the user of the second device (e.g., POTS phone 107) is connected to an auto-attendant (e.g., automated attendant 220 of FIG. 4) at the specified IVR (e.g., IVR 111C). In one embodiment the automated attendant greets the user of the second device and then explains the network error (such as "Your call was disconnected due to a network error.").

FIG. 5D depicts a high level block diagram of the system 195C applying the second rule 536 described above for FIG. 5C according to one embodiment of the present invention. Here, FIG. 5D depicts elements similar to those described above for FIG. 1, so that description will not be repeated here. Like elements have like reference numerals.

POTS phone 107 transmits a signal 520A-1 through the PSTN (or SIP trunk) 180 that terminates at the switch 130C. The IVR 111C is notified of the call and the POTS phone 107 is connected to the IVR 111C for a period of time while the mandatory prompts are played. Once the mandatory prompts are completed, the switch 130C transmits a signal 520A-2 connecting the POTS phone 107 on a call with IP phone 122C. In this example, the rule determination module 320C comprised within the switch 130C determines from the failover list 204 that IVR 111C is the failover device. The rule determination module 320C also determines, from the recovery rules, the static recover rule 536 described above for FIG. 5C. The call rerouting module 322 periodically transmits call profile data to the IVR 111C so that if a call failure event occurs, the IVR 111C is connected on a newly built communicative connection with the POTS phone 107. Upon the failure tracking module 316C detecting a network failure, the call rerouting module 322 transmits a signal 520B with an invite message to the server 110C so that a new communicative connection is built between the IVR 110C and the switch 130C so that the POTS phone 107 is connected on a call with the IVR 110C.

In one embodiment, the call recovery rule depicted in FIGS. 5C and 5D is a default static call recovery rule preprogrammed into the switch 130A, 130B, 130C. Had their been a dynamic recovery rule, the dynamic recovery rule would have been applied and the static recovery rule would have been ignored.

FIG. 5E depicts a table 595C showing a third call failure rule according to one embodiment of the present invention. In the depicted embodiment, the third call failure rule is a dynamic call failure rule. The first column 510 of the table shows a third call description 540, the second column 512 shows a third call failure description 542, the third column 514 shows a third failover device 544 and the fourth column 516 shows third recovery rule 546.

Figure 5F:
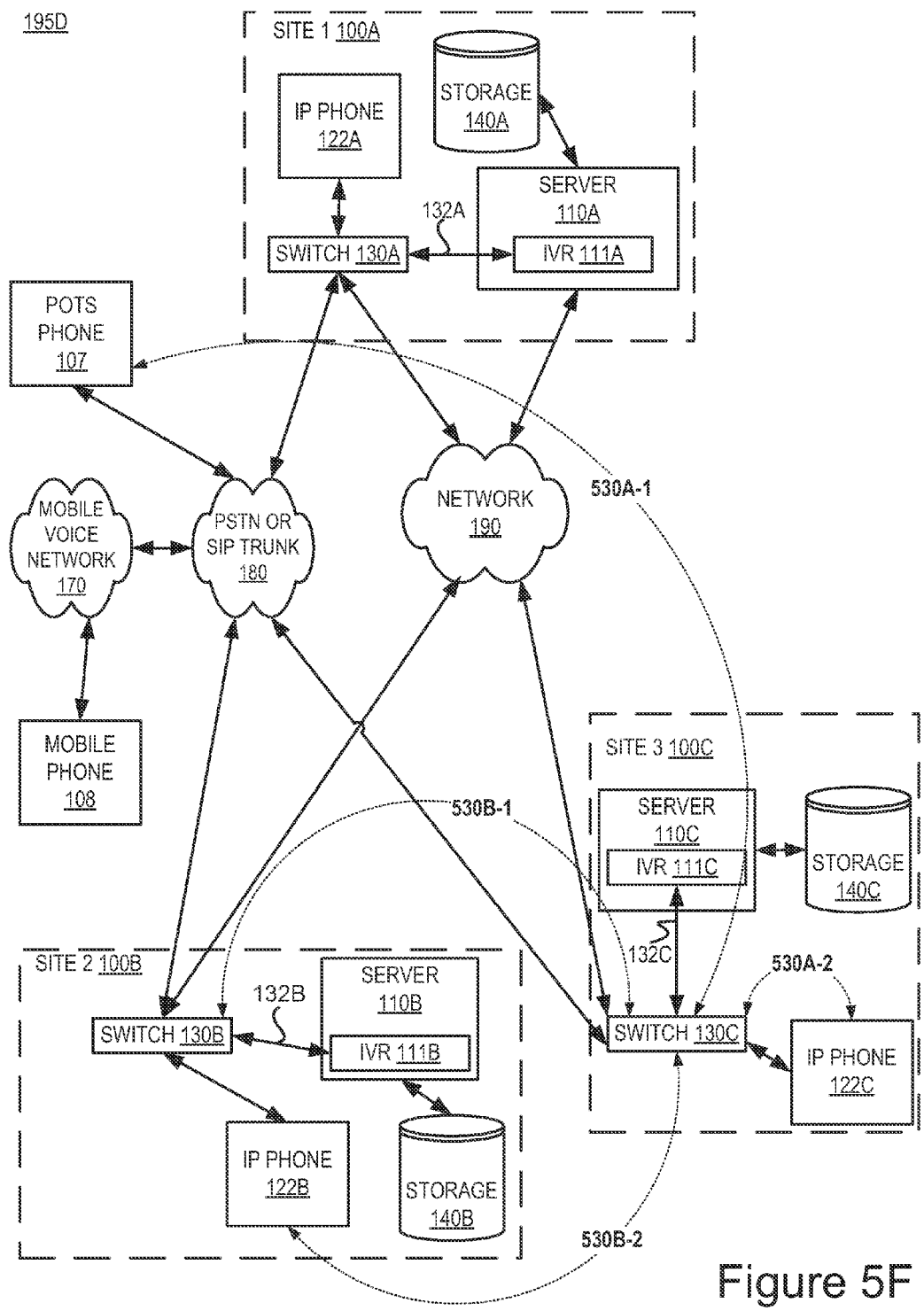

The third call description 540 describes a second device connected on a call with a first device. For example, the POT phone 107 is connected on a call with IP phone 122C (as shown in FIG. 5F). The third call failure description 542 that triggers the first rule 546 is a first device hang-up. The third failover device 544 is a specified IP phone. In this example, the rule determination module 320C comprised within the switch 130C determines that the failover device list 204 specifies IP phone 122B as the failover device (see FIG. 5F) since it is the highest priority failover device that is both available and within a predetermined proximity. The dynamic rule module 314C comprised within the switch 130C determines a dynamic recovery rule 546 indicating that if a call hang-up failure is detected, the call manager 150C recovers the call by building a new communicative connection between a specified IP phone 122 (e.g., phone 122B) and the switch 130C so that the second device (e.g., POT phone 107) and the specified IP phone 122 are connected on a call via the switch 130C.

FIG. 5F depicts a high level block diagram of the system 195D applying the third rule described above for FIG. 5E. Here, FIG. 5F depicts elements similar to those described above for FIG. 1, so that description will not be repeated here. Like elements have like reference numerals.

POT phone 107 transmits a signal 530A-1 through the PSTN (or SIP trunk) 180 that terminates at the switch 130C. The POT phone 107 is connected to the IVR 111C for a mandatory number of prompts. After the mandatory number of prompts is completed, the switch 130C transmits a signal 530A-2 connecting the call with IP phone 122C. The dynamic rule module 314C determines that a device specific recovery rule applies to all calls connected to IP phone 122B. In this example, the rule determination module 320C determines from the device specific recovery rule that IP phone 122B is failover device for all calls connected to IP phone 122C. The call rerouting module 322C periodically transmits call profile data to the IP phone 122B. In one embodiment, the recipient of the call profile data stores the call profile data for later use, and when the call failure event occurs, the call profile data is used to rebuild the call and/or to continue the call with the second device so that no call failure event is evident to the user of the second device. For example, the user of the IP phone 122B is provided a list of questions asked by the user of the IP phone 122C and the corresponding answers provided by the user of POT phone 107 so that, in this way, the user of IP phone 122B can continue the phone conversation with the user of POT phone 107. The dynamic rule module 314C determines the device specific, dynamic recovery rule described above for FIG. 5E. The call rerouting module 322C transmits a signal 530B-1 with an invite message to switch 130B. The call manager 150C works with the switch 130B to build a communicative connection between IP phone 122B and the switch 130C by sending signal 530B-2 to connect IP phone 122B on a call with the POT phone 107. The switch 130C acts as a gateway between the POT phone 107 and IP phone 122B.

Methods

Figure 6A:
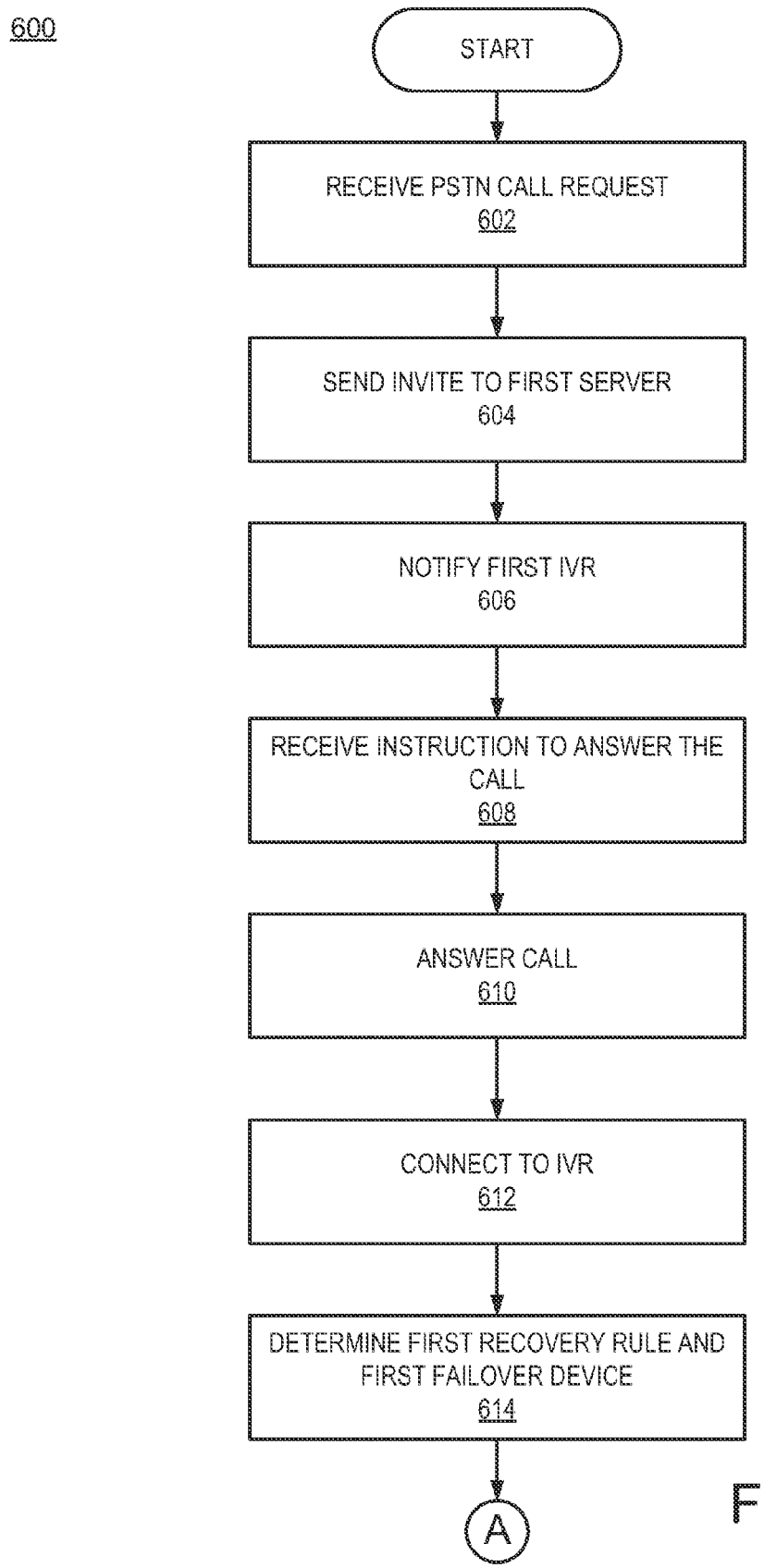
FIGS. 6A, 6B and 6C are flowcharts illustrating a method for recovering a call after detecting a call failure event according to one embodiment of the present invention.
Figure 6B:
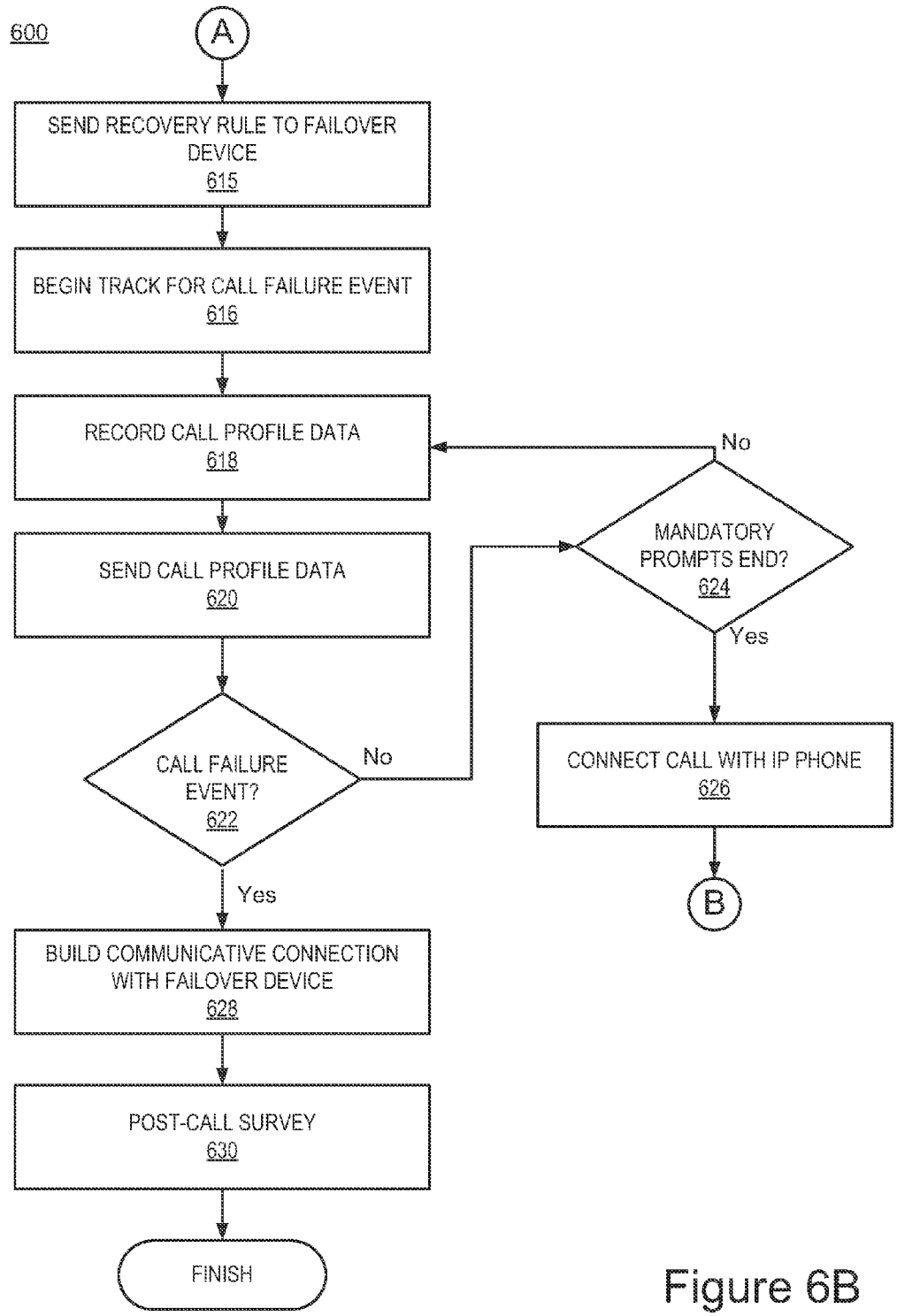
Figure 6C:
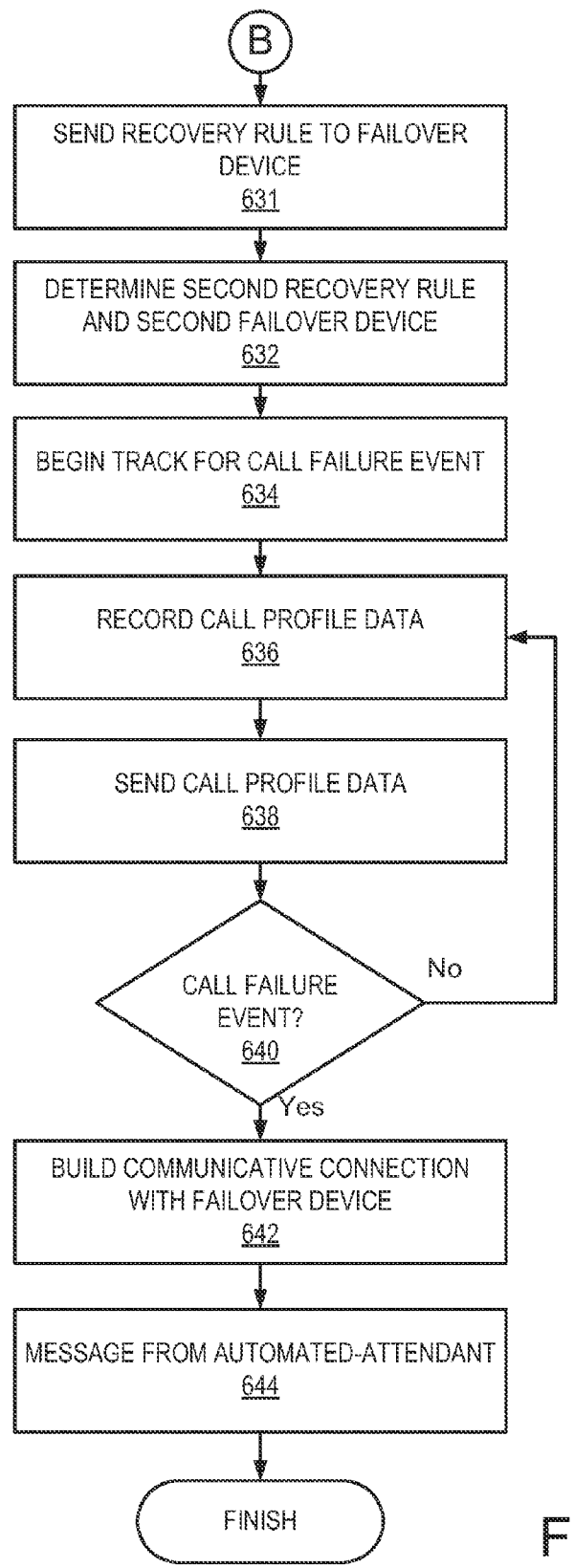

FIGS. 6A, 6B and 6C depict a diagram illustrating a method for call recovery according to one embodiment of the present invention. A first switch 130 receives 602 a call request. The call request is from a second device operating through the PSTN network 180. The first switch 130 sends 604 an invite to a first server 110. In one embodiment, the first server 110 is communicatively coupled to an endpoint specified by the call request. The first server 110 notifies 606 the first IVR 111. In one embodiment, the first IVR 111 is comprised within the first server 110. The first switch 130 receives 608 an instruction to answer the call. In one embodiment, the instruction to answer the call is received responsive to the endpoint receiving an input, from a user of the endpoint, indicating that the user would like to answer the call. In another embodiment, the IVR 111 provides the input to answer the call. The switch 130 answers 610 the call. The switch 130 connects 612 the second device to the IVR 111. In one embodiment, the IVR 111 plays a number of mandatory prompts for the user. As the prompts are played, the dynamic rule module 314 determines 614 whether a dynamic rule applies, and the rule determination module 320 determines 614 the first failover device for the call and a recovery rule that applies while the call is connected to the IVR 111.

Turning to FIG. 6B, a first call rerouting module 322 comprised within the first switch 130 sends 615 the call recovery rule to the first failover device. In one embodiment, this step 615 is performed cotemporaneous with step 620 in which call profile data is sent to the first failover device. A first failure tracking module 316 comprised within the first switch 130 tracks 616 the call for call failure events while the second device is connected to the IVR 111. A first call data module 318 comprised within the first switch 130 records 618 call profile data and stores the call profile data on non-transitory computer readable memory such as the first storage device 140 communicatively coupled to one or more of the first switch 130 or the first server 110. In one embodiment, the call profile data includes (1) the progress through the IVR script, (2) the answers received from the second device or (3) the progress through the IVR script and the answers received from the second device. In one embodiment, the first failover device uses the call profile data to continue the mandatory questions for the second device so that the second device has no indication that the call failure event occurred.

The first call rerouting module 322 sends 620 the call profile data to one of (1) a second switch 130 communicatively coupled to the first failover device, (2) a second server 110 communicatively coupled to the first failover device and (3) the first failover device itself. In one embodiment, the call recovery rule is sent at the same time as the call profile data the first time the call profile data is sent, but then the call recovery rule is not resent on subsequent instances of step 620 so that the call recovery rule is only sent to the failover device once. In one embodiment, the call rerouting module 322 sends the delta of the call profile data to the failover device. In one embodiment, the call profile data is sent to the second server 110 via the second switch 130. The first failure tracking module 316 determines 622 whether a call failure event has occurred. If no call failure event has occurred at step 622, the method goes to step 624. If a call failure event occurs at step 622, the first call rerouting module 322 builds 628 a new communicative connection with the first failover device by sending an invite to the second server 110 via the second switch 130, and the first call rerouting module 322 works with the second server 110 to build a new call between the second device and the first failover device. The above-described step of building a new communicative connection between the second device and the failover device is referred to as "building a failover call." In one embodiment, the failover device is a second IVR 111 and the user of the second device is prompted 630 by questions from a post call survey.

At step 622 the call manager 150 determines whether the IVR 111 has completed the mandatory prompts. In one embodiment, the step of determining whether the IVR 111 has completed the mandatory prompts is determined by the IVR 111 sending a signal to the call rerouting module 322 when the last prompt is completed and the call rerouting module reroutes 626 the call so that the second device is connected with the IP phone 122 specified by the initial call request. In one embodiment, the call rerouting module 322 connects 626 the second device on a first available IP phone 122 (i.e., and IP phone 122 not already connected on a call with another device). If at step 624 the mandatory prompts are not completed, the method goes back to step 618.

In one embodiment, the first failover device is located within the same site 100 as the original endpoint for which the call was directed, and the site 100 does not include two or more switches 130 or two or more servers 130. In this embodiment the call profile data described with reference to step 620 is sent to one of (1) the first switch 130, (2) first server 110 and (3) the failover device itself. Also, the invite described with reference to step 628 is sent to the first server 110.

Referring now to FIG. 6C, the second device is connected with the IP phone 122. In this method the IP phone is at a different site 100 than the IVR 111 described for FIGS. 6A and 6B, and is coupled to a different switch 130 than the first switch 130 described for FIGS. 6A and 6B.

A second call rerouting module 322 comprised within the second switch 130 sends 631 the call recovery rule to the second failover device. In one embodiment, this step 631 is performed cotemporaneous with step 638 in which call profile data is sent to the second failover device. In another embodiment, the call recovery rule is only sent to the second failover device once.

A second dynamic rule module 314 comprised within the second switch 130 determines 632 whether a dynamic rule applies, and the second rule determination module 320 comprised within the second switch 130 determines 632 the second failover device for the call and a recovery rule that applies while the call is connected to the IP phone 122.

The second failure tracking module 316 comprised within the second switch 130 tracks 634 the call for call failure events while the second device is connected to the IP phone 122.

A second call data module 318 comprised within the second switch 130 records 636 call profile data and stores the call profile data on non-transitory computer readable memory such as a second storage device 140 communicatively coupled to one or more of the second switch 130 or a second server 110.

The second call rerouting module 322 sends 638 the call profile data to one of (1) a third switch 130 communicatively coupled to the second failover device, (2) a third server 110 communicatively coupled to the second failover device and (3) the second failover device itself. In one embodiment, the second call rerouting module 322 sends 311 the delta of the call profile data. In one embodiment, the call profile data is sent to the third server 110 via the third switch 130.

The second failure tracking module 316 determines 640 whether a call failure event has occurred. If no call failure event has occurred at step 640, the method goes to step 636. If a call failure event occurs at step 640, the second call rerouting module 322 builds 642 a new communicative connection with the second failover device by sending an invite to the third server 110 via the third switch 130, and the second call rerouting module 322 works with the third server 110 to build a new communicative connection between the second device and the second failover device. In one embodiment, the second failover device is an IVR 111 having an automated attendant module 220 (see FIG. 4) and the second device is provided 644 with a message explaining the call failure.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for call recovery, the method comprising:
   determining a recovery rule for a call having a first communicative connection with a first device and a second communicative connection with a second device, wherein the recovery rule is a dynamic recovery rule and wherein determining the recovery rule for the call comprises (a) determining that a failover device is a highest priority failover device that is (1) available and (2) within a predetermined proximity of a switch upon which the call is terminated, and (b) determining that the recovery rule is that the failover device will build a new communicative connection with the switch responsive to a call failure event so that the failover device is connected on a call with the second device;
   identifying, based on the recovery rule, the failover device for the call;
   sending the recovery rule to the failover device; and
   building, responsive to the call failure event, the new communicative connection with the failover device based on the recovery rule.

2. The method of claim 1, wherein the call recovery rule is used by the failover device to build the new communicative connection responsive to the call failure event.

3. The method of claim 1, wherein determining the recovery rule for the call comprises:
   determining the failover device based on a first device currently connected on the call; and
   determining that the recovery rule is that the failover device will build the new communicative connection responsive to the call failure event.

4. The method of claim 1, wherein the failover device is an interactive voice response module stored in the memory of a server communicatively coupled to a switch upon which the call is terminated.

5. The method of claim 4 further comprising, responsive to building the new communicative coupling, connecting the second device to a survey engine.

6. The method of claim 1 further comprising:
   recording call profile data;
   sending the call profile data to the failover device.

7. A system for call recovery, the system comprising:
   a first device communicatively coupled to a switch and having a first communicative connection with the switch;
   a second device communicatively coupled to the switch and having a second communicative connection with the switch, wherein the first communicative connection and the second communicative connection form a call between the first device and the second device;
   the switch comprising:
       a rule determination module adapted to determine a recovery rule for the call between the first device and the second device, and to identify a failover device based on the recover rule, wherein the recovery rule is a dynamic recovery rule and determining the recovery rule comprises (a) determining that the failover device is a highest priority failover device that is (1) available and (2) within a predetermined proximity of the switch, and (b) determining that the recovery rule is that the failover device will build a new communicative connection with the switch responsive to a call failure event;
       a call rerouting module communicatively coupled to the failover device and adapted to send the recovery rule to the failover device; and
       a failure tracking module adapted to determine the call failure event during the call between the second device and the first device; and
   the failover device communicatively coupled to the switch and adapted to communicate with the switch to receive the recovery rule and build, based on the recovery rule, the new communicative connection with the switch so that the failover device is communicatively coupled to the second device responsive to the call failure event.

8. The system of claim 7, wherein responsive to building the call leg between the second device and the failover device, a automated attendant provides the second device with a description of the call failure event.

9. The system of claim 7, wherein determining the recovery rule comprises:
   determining the failover device based on a first device currently connected on the call; and
   determining that the recovery rule is that the failover device will build the new communicative connection with the switch responsive to the call failure event.

10. The system of claim 7, wherein the failover device is an interactive voice response module comprised within a memory of a server that is communicatively coupled to the switch.

11. The system of claim 10 wherein, responsive to building the new communicative connection, the interactive voice response module connects the second device to a survey engine communicatively coupled to the interactive voice response module.

12. The system of claim 7, wherein the switch further comprises a call data module communicatively coupled to the failover device adapted to record call profile data and send the call profile data to the failover device.

13. An apparatus for call recovery, the apparatus comprising:
   a non-transitory computer readable memory storing processor executable computer code, the computer code comprising instructions for causing a processor to perform steps comprising:
       determining a recovery rule for a call having a first communicative connection with a first device and a second communicative connection with a second device, wherein the recovery rule is a dynamic recovery rule and wherein determining the recovery rule for the call comprises (a) determining that a failover device is a highest priority failover device that is (1) available and (2) within a predetermined proximity of a switch upon which the call is terminated, and (b) determining that the recovery rule is that the failover device will build a new communicative connection with the switch responsive to a call failure event;
       identifying, based on the recovery rule, a failover device for the call; and building, responsive to a call failure event, a new communicative connection with the failover device based on the recovery rule.

14. The apparatus of claim 13, wherein the call recovery rule is used by the failover device to build the new communicative connection responsive to the call failure event.

15. The apparatus of claim 13, wherein determining the recovery rule for the call comprises:
   determining the failover device based on the first device currently connected on the call; and
   determining that the recovery rule is that the failover device will build the new communicative connection responsive to the call failure event.

16. The apparatus of claim 13, wherein the failover device is an interactive voice response module stored in the memory of a server communicatively coupled to a switch that comprises the memory.

17. The apparatus of claim 16, wherein the computer code further comprises instructions for causing a processor to perform further steps comprising:
   connecting, responsive to building the new communicative connection, the second device to a survey engine communicatively coupled to the interactive voice response module.

18. The apparatus of claim 13, wherein the computer code further comprises instructions for causing a processor to perform further steps comprising:
   recording call profile data;
   sending the call profile data to the failover device.

19. The apparatus of claim 13, wherein the computer code further comprises instructions for causing a processor to perform a further step comprising sending the recovery rule to the failover device.

20. A method for call recovery, the method comprising:
   determining a recovery rule for a call having a first communicative connection with a first device and a second communicative connection with a second device;
   identifying, based on the recovery rule, a failover device for the call;
   recording call profile data;
   sending the call profile data to the failover device, wherein the call profile data describes one or more of: (1) a progress of an IVR through an IVR script with the second device; (2) an input provided by the second device responsive to a prompt in the IVR script; (3) information describing the first device that is a party to the call; (4) information describing the second device; and (5) information describing the call quality during the call;
   sending the recovery rule to the failover device; and
   building, responsive to a call failure event, a new communicative connection with the failover device based on the recovery rule.

21. The method of claim 20, wherein the recovery rule is one of a dynamic recovery rule.

22. The method of claim 20, wherein the recovery rule is a static recovery rule that specifies that the failover device is a communication device comprising an automated attendant.

23. The method of claim 22, wherein responsive to building the new communicative connection with the second device, the automated attendant provides the second device with a description of the call failure event.

24. A system for call recovery, the system comprising:
   a first device communicatively coupled to a switch and having a first communicative connection with the switch;
   a second device communicatively coupled to the switch and having a second communicative connection with the switch, wherein the first communicative connection and the second communicative connection form a call between the first device and the second device;
   the switch comprising:
      a rule determination module adapted to determine a recovery rule for the call between the first device and the second device, and to identify a failover device based on the recover rule;
      a call rerouting module communicatively coupled to the failover device and adapted to send the recovery rule to the failover device;
      a failure tracking module adapted to determine a call failure event during the call between the second device and the first device; and
      a call data module communicatively coupled to the failover device adapted to record call profile data and send the call profile data to the failover device, wherein the call profile data describes one or more of: (1) a progress of the interactive voice response module through the through an IVR script; (2) an input provided by the second device responsive to a prompt in an IVR script; (3) information describing the first device that is a party to the call; (4) information describing the second device; and (5) information describing the call quality during the call; and
   the failover device communicatively coupled to the switch and adapted to communicate with the switch to receive the recovery rule and build, based on the recovery rule, a new communicative connection with the switch so that the failover device is communicatively coupled to the second device responsive to the call failure event.

25. The system of claim 24, wherein the recovery rule is one of a dynamic recovery rule.

26. The system of claim 24, wherein the recovery rule is a static recovery rule and the failover device is a communication device comprising an automated attendant.

27. An apparatus for call recovery, the apparatus comprising:
   a non-transitory computer readable memory storing processor executable computer code, the computer code comprising instructions for causing a processor to perform steps comprising:
      determining a recovery rule for a call having a first communicative connection with a first device and a second communicative connection with a second device;
      identifying, based on the recovery rule, a failover device for the call;
      recording call profile data; and
      sending the call profile data to the failover device, wherein the call profile data describes one or more of: (1) a progress of an IVR through an IVR script with the second device; (2) an input provided by the second device responsive to a prompt in the IVR script; (3) information describing the first device that is a party to the call; (4) information describing the second device; and (5) information describing the call quality during the call; and
      building, responsive to a call failure event, a new communicative connection with the failover device based on the recovery rule.

28. The apparatus of claim 27, wherein the recovery rule is one of a dynamic recovery rule.

29. The apparatus of claim 27, wherein the recovery rule is a static recovery rule that specifies that the failover device is a communication device comprising an automated attendant.

30. The apparatus of claim 29, the automated attendant is adapted to provide the second device with a description of the call failure event.

\* \* \* \* \*